United States Patent
Chan et al.

(10) Patent No.: US 8,229,216 B2
(45) Date of Patent: Jul. 24, 2012

(54) METHOD FOR ADJUSTING SKIN COLOR OF DIGITAL IMAGE

(75) Inventors: Chen-Hung Chan, Taoyuan County (TW); Hong-Long Chou, Taipei (TW)

(73) Assignee: Altek Corporation, Hsinchu (TW)

( * ) Notice: Subject to any disclaimer, the term of this patent is extended or adjusted under 35 U.S.C. 154(b) by 680 days.

(21) Appl. No.: 12/428,920

(22) Filed: Apr. 23, 2009

(65) Prior Publication Data

US 2010/0166304 A1 Jul. 1, 2010

(30) Foreign Application Priority Data

Dec. 31, 2008 (TW) .............................. 97151813 A

(51) Int. Cl.
 *G06K 9/00* (2006.01)
(52) U.S. Cl. ........ 382/167; 382/165; 382/166; 348/238; 348/246; 348/286
(58) Field of Classification Search .................. 382/165, 382/166, 167; 348/238, 246, 286
See application file for complete search history.

(56) References Cited

U.S. PATENT DOCUMENTS

| | | | | |
|---|---|---|---|---|
| 5,384,601 A * | 1/1995 | Yamashita et al. | ............ | 348/577 |
| 2004/0208363 A1* | 10/2004 | Berge et al. | .................... | 382/167 |
| 2006/0088210 A1* | 4/2006 | Yu et al. | ........................ | 382/167 |
| 2009/0141149 A1* | 6/2009 | Zhang et al. | .................. | 348/241 |

* cited by examiner

*Primary Examiner* — Chan S Park
*Assistant Examiner* — Eueng-Nan Yeh
(74) *Attorney, Agent, or Firm* — Morris Manning & Martin LLP; Tim Tingkang Xia, Esq.

(57) ABSTRACT

A method for adjusting a skin color of a digital image adjusts the skin color of an input image. The method includes performing a skin color detection process on the input image to generate a skin-color probability plot Sp in a size corresponding to the input image; providing a hue-saturation lookup table named LUT_Color; performing a skin-color reproduction process on the input image to look up the LUT_Color for a chrominance pixel value for each pixel value of the input image to generate a first image, and adjust each pixel value of the first image by using the skin-color probability plot Sp to generate a second image; performing a skin color smoothing process on the second image to generate a third image; and mixing pixel values of the input image and the third image to generate a target image.

10 Claims, 7 Drawing Sheets

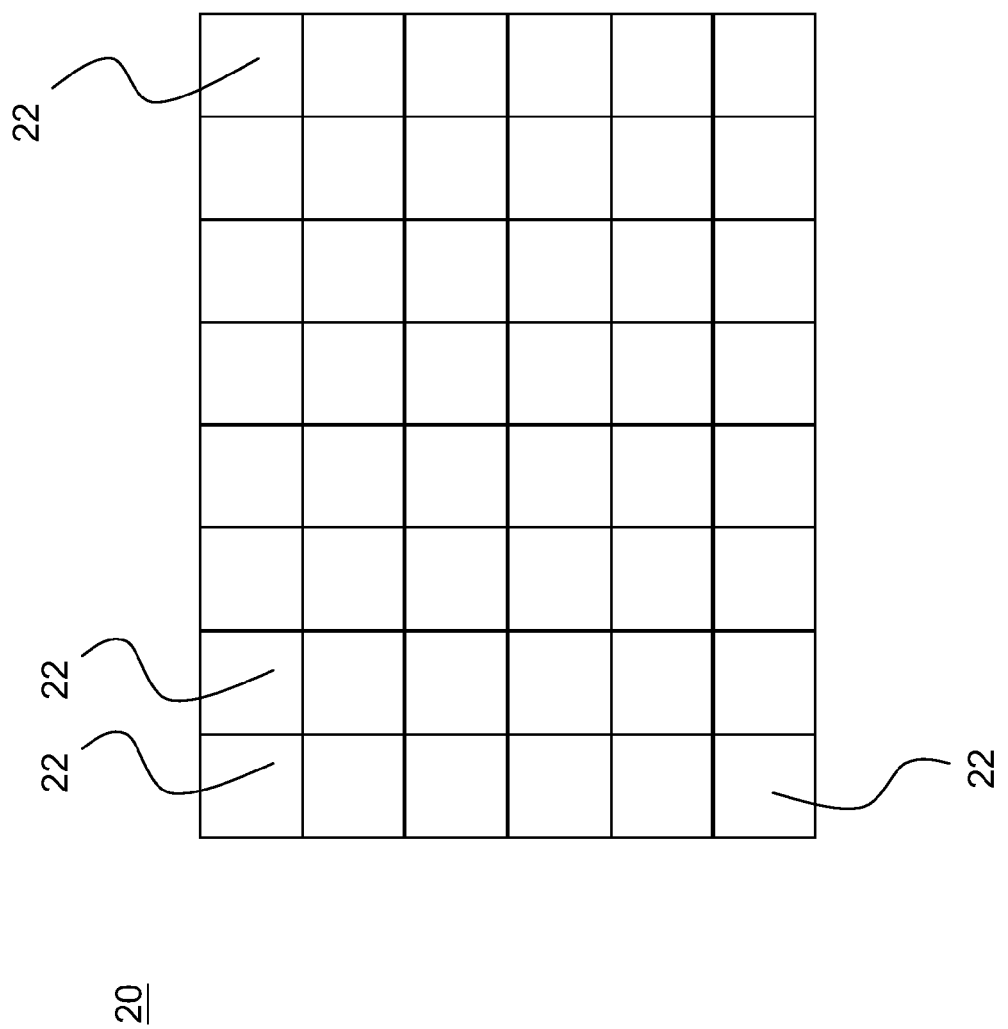

ΜΕΤΗΟD FOR ADJUSTING SKIN COLOR OF DIGITAL IMAGE

CROSS-REFERENCE TO RELATED APPLICATIONS

This non-provisional application claims priority under 35 U.S.C. §119(a) on Patent Application No(s). 097151813 filed in Taiwan, R.O.C. on Dec. 31, 2008 the entire contents of which are hereby incorporated by reference.

BACKGROUND OF THE INVENTION

1. Field of Invention

The present invention relates to an image processing method, and more particularly to a method for adjusting a skin color of a person captured in a digital image.

2. Related Art

With the development of digital cameras, photography is no longer expensive. A user can capture a desired image at will to record a memorable moment or scene. Especially, many photographers mainly focus on shooting portraits. However, if a person to be shot has spots, dust, fine wrinkles, or the like on the face during shooting, the aesthetic feeling of viewers about the shot digital image may be affected.

This problem may be solved by using digital image editing software to edit details of the digital image. However, as ordinary users are not all familiar with the image editing software, it is difficult for beginners to employ this method. Another method is to soften the image. Although the colors of the above color block portion can be diluted through this method, portions in the digital image that do not need to be adjusted are also softened as the softening process is used for processing the entire digital image. As a result, the aesthetic feeling of the digital image is lowered.

SUMMARY OF THE INVENTION

Accordingly, the present invention is a method for adjusting a skin color of a digital image, which is adapted to adjust the skin color of an input image.

To achieve the above objective, a method for adjusting a skin color of a digital image is provided. The method comprises: loading an input image; performing a skin color detection process on the input image to generate a skin-color probability plot Sp in a size corresponding to the input image; providing a hue-saturation lookup table named LUT_Color; performing a skin color reproduction process on the input image to look up the LUT_Color for a chrominance pixel value for each pixel value of the input image to generate a first image, and adjust each pixel value of the first image by using the skin-color probability plot Sp to generate a second image; performing a skin color smoothing process on the second image to generate a third image; performing an image mixing process to mix pixel values of the input image and the third image at a mixing ratio to generate a target image.

The present invention provides a method for beautifying a skin color in a digital image, especially the facial skin of a person captured in the image. In the present invention, the skin-color probability plot is used to perform a skin color comparison on the input image to remove noises (especially dark spots, dust, or other non-skin-color images) other than the skin color, so as to improve integrity of the skin of the person captured in the digital image, thus improving the appearance of the person captured in the digital image.

BRIEF DESCRIPTION OF THE DRAWINGS

The present invention will become more fully understood from the detailed description given herein below for illustration only, and thus are not limitative of the present invention, and wherein:

FIG. 7 is a schematic view of selected windows selected from an image according to one embodiment of the present invention.

DETAILED DESCRIPTION OF THE INVENTION

Figure 1:
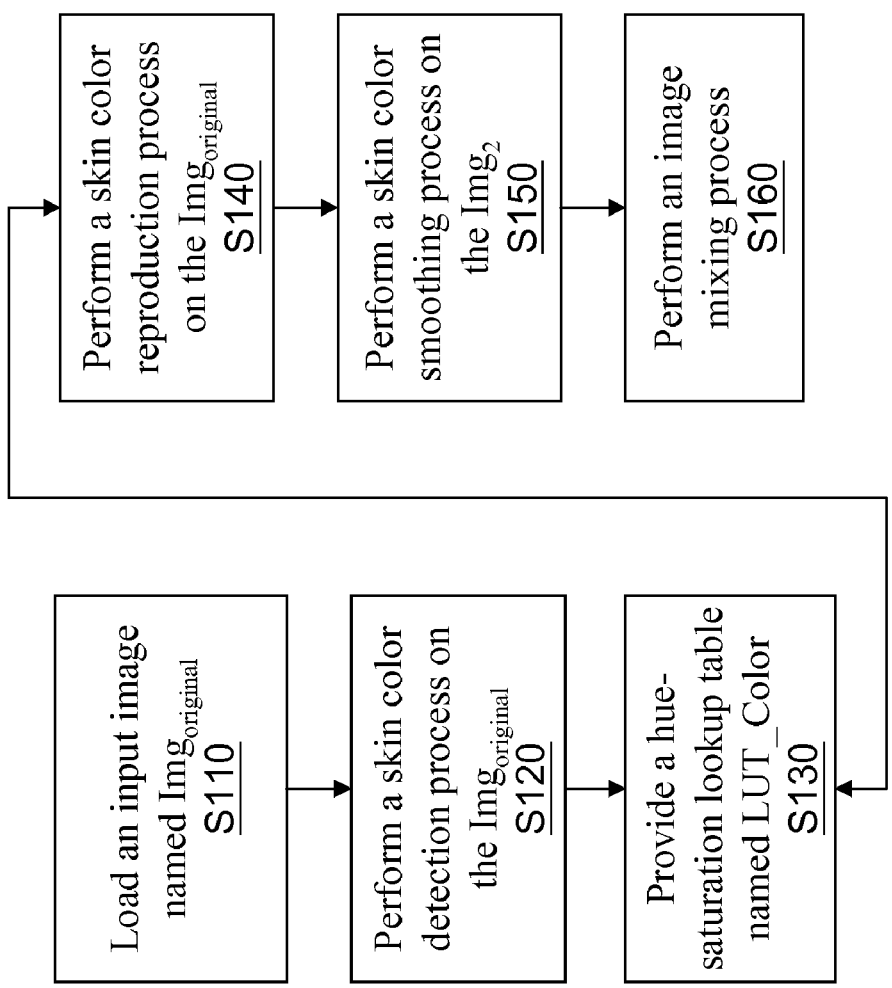
FIG. 1 is a schematic flow chart of the present invention.

The present invention is applicable to electronic devices with an image processing function, such as, but not limited to, personal computers, digital cameras, and digital frames. FIG. 1 is a schematic view of an operation process of the present invention.

The present invention comprises the following steps:

Load an input image named $Img_{original}$ (Step S110), in which the $Img_{original}$ at least comprises a luminance image Y, a blue chrominance image Cb, and a red chrominance image Cr;

Perform a skin color detection process on the $Img_{original}$ (Step S120) to generate a skin-color probability plot Sp in a size corresponding to the $Img_{original}$;

Provide a hue-saturation lookup table named LUT_Color. (Step S130);

Perform a skin color reproduction process on the $Img_{original}$ (Step S140) to look up the LUT_Color for a chrominance pixel value of a corresponding color for each pixel value of the $Img_{original}$ to generate a first image named $Img_1$, and adjust each pixel value of the $Img_1$ by using the skin-color probability plot Sp to generate a second image named $Img_2$;

Perform a skin color smoothing process on the $Img_2$ (Step S150) to generate a third image named $Img_3$; and Perform an image mixing process (Step S160) to mix pixel values of the $Img_{original}$ and the $Img_3$ at a corresponding mixing ratio to generate a target image named $Img_{tar}$.

The skin color detection process in Step S120 is based on specific areas covered by the human skin color in the color space. According to a preferred embodiment of the present invention, a skin-color probability model is built by using a Gaussian function or a lookup table, and detection is performed by using the skin-color probability model to find out pixels in the skin color in an input digital image, thus creating a corresponding skin-color probability plot in the skin color detection process. The skin-color probability plot has a value range of 0-255. The greater the value is in the skin-color probability plot, the closer the color is to the skin color, and vice versa.

Figure 2:
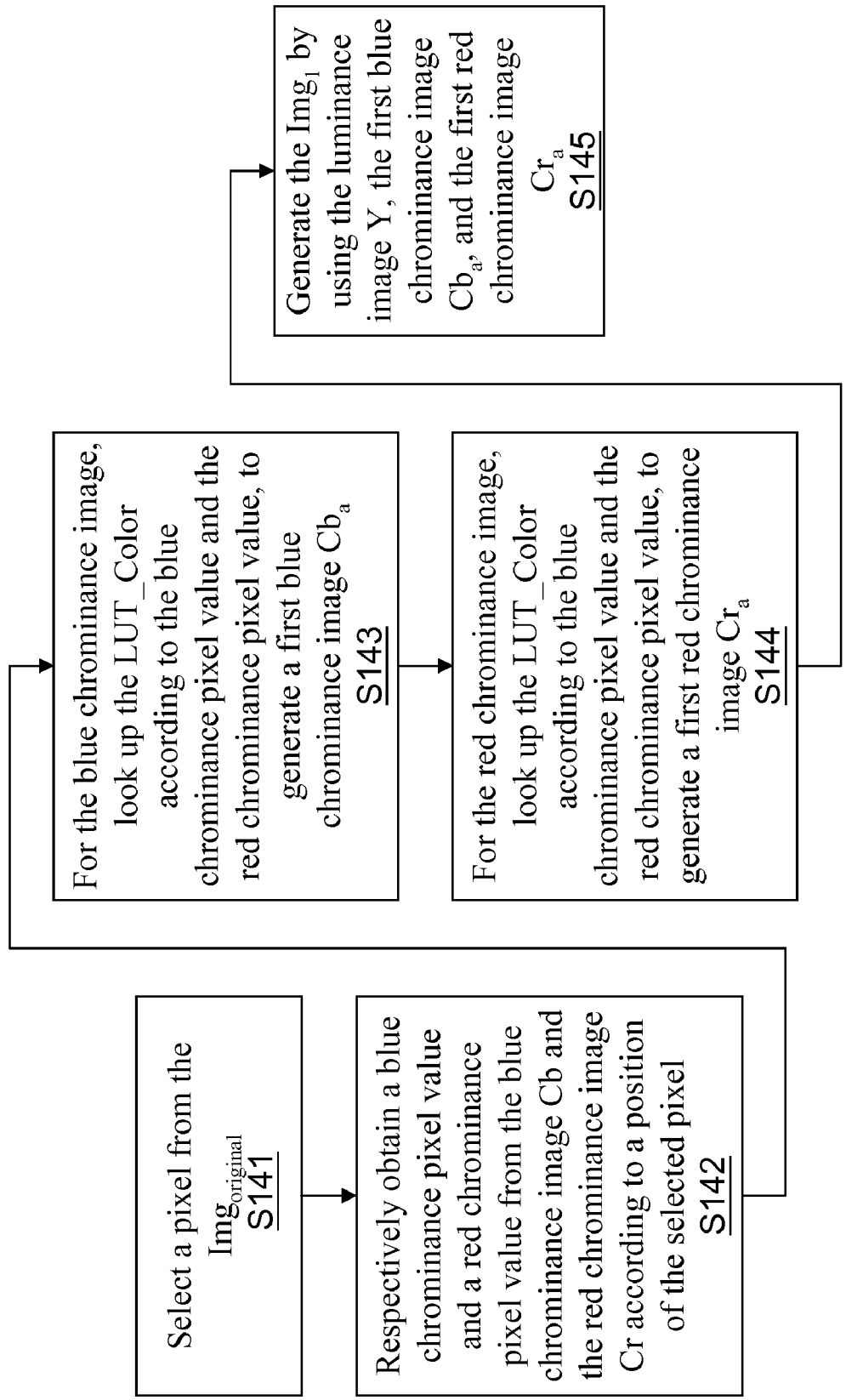
FIG. 2 is a schematic view of the process for looking up the hue-saturation lookup table for a chrominance pixel value of a corresponding color in Step S140.

FIG. 2 is a schematic view of the process for looking up the LUT_Color for a chrominance pixel value of a corresponding color in Step S140, which further comprises the following steps:

Select a pixel from the Img$_{original}$ (Step S141);

Respectively obtain a blue chrominance pixel value and a red chrominance pixel value from the blue chrominance image Cb and the red chrominance image Cr according to a position of the selected pixel (Step S142);

For the blue chrominance image, look up the LUT_Color according to the blue chrominance pixel value and the red chrominance pixel value, to generate a first blue chrominance image Cb$_a$ (Step S143), in which $$Cb_a = \text{LUT\_Color [Cb] [Cr]} \quad \text{(Equation 1);}$$

For the red chrominance image, look up the LUT_Color according to the blue chrominance pixel value and the red chrominance pixel value, to generate a first red chrominance image Cr$_a$ (Step S144), in which $$Cr_a = \text{LUT\_Color [Cr] [Cb]} \quad \text{(Equation 2); and}$$

Generate the Img$_1$ by using the luminance image Y, the first blue chrominance image Cb$_a$, and the first red chrominance image Cr$_a$ (Step S145).

Figure 3:
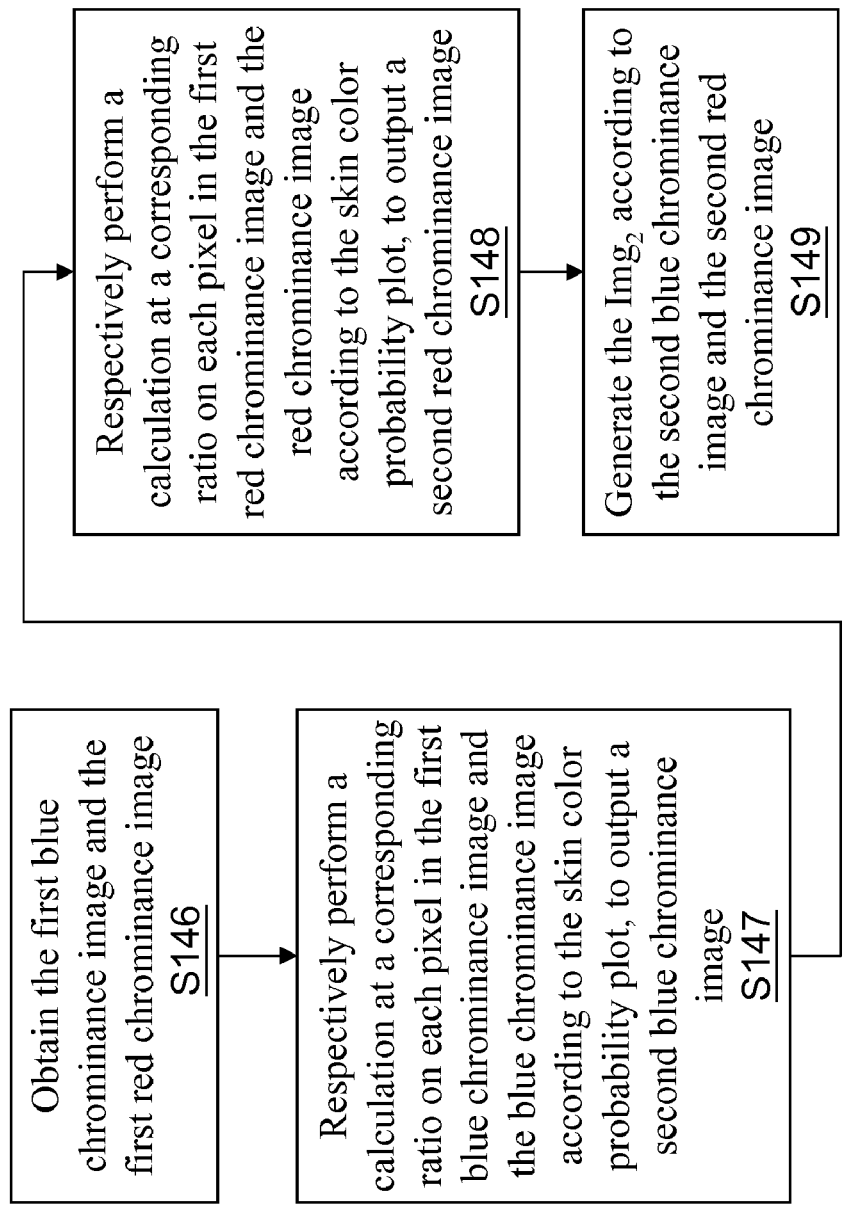
FIG. 3 is a schematic view of the process for adjusting the first image by using the skin-color probability plot in Step S140.

FIG. 3 is a schematic view of the process for adjusting the Img$_1$ by using the skin-color probability plot in Step S140, which further comprises the following steps:

Obtain the first blue chrominance image Cb$_a$ and the first red chrominance image Cr$_a$ (Step S146);

Respectively perform a calculation at a corresponding ratio on each pixel in the first blue chrominance image Cb$_a$ and the blue chrominance image Cb according to the skin-color probability plot (named Sp), to output a second blue chrominance image Cb$_c$ (Step S147), in which $$Cb_c(x,y) = Sp(x,y) \times Cb_a(x,y) + (255 - Sp(x,y) \times Cb(x,y)) \quad \text{(Equation 3),}$$

where (x,y) is position coordinates of a pixel;

Respectively perform a calculation at a corresponding ratio on each pixel in the first red chrominance image Cr$_a$ and the red chrominance image Cr according to the skin-color probability plot Sp, to output a second red chrominance image Cr$_c$ (Step S148), in which $$Cr_c(x,y) = Sp(x,y) \times Cr_a(x,y) + (255 - Sp(x,y) \times Cr(x,y)) \quad \text{(Equation 4),}$$

where (x,y) is position coordinates of a pixel; and

Generate the Img$_2$ according to the second blue chrominance image Cb$_c$ and the second red chrominance image Cr$_c$ (Step S149).

Figure 4:
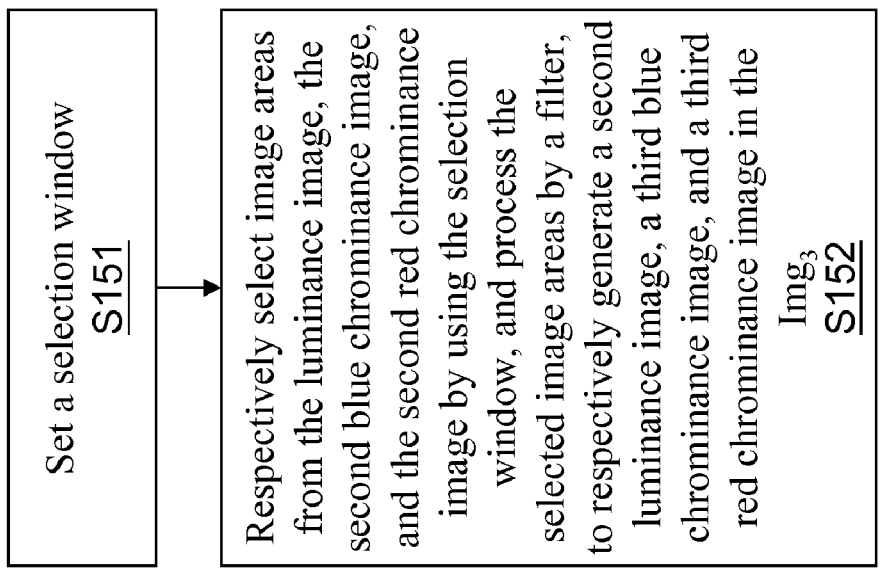
FIG. 4 shows the process for performing the skin color smoothing process in Step S150.

FIG. 4 is a schematic view of the process of performing the skin color smoothing process in Step S150, which comprises the following steps:

Set a selection window (Step S151), and sequentially select areas from the images in a non-overlapping manner, in which the selection window is used for selecting areas at a same position and in a same pixel array size in the luminance image Y, the second blue chrominance image Cb$_c$, and the second red chrominance image Cr$_c$; and Respectively select image areas from the luminance image Y, the second blue chrominance image Cb$_c$, and the second red chrominance image Cr$_c$ by using the selection window, and process the selected image areas by a filter, to respectively generate a second luminance image Y$_{LP}$, a third blue chrominance image Cb$_{LP}$, and a third red chrominance image Cr$_{LP}$ in the Img$_3$ (Step S152), in which $$Y_{LP}(x, y) = \frac{\sum Y(i \cdot j)}{N}, \quad \text{(Equation 5)}$$

$$Cb_{LP}(x, y) = \frac{\sum Cb_c(i \cdot j)}{N}, \quad \text{(Equation 6)}$$

$$Cr_{LP}(x, y) = \frac{\sum Cr_c(i \cdot j)}{N}, \quad \text{(Equation 7)}$$

where (x,y) is position coordinates of a pixel, and N is a number of pixels in the selection window. The filter is preferably a low-pass filter or a nonlinear filter for softening the image. As shown in FIG. 7, selection windows 22 are sequentially selected from the image 20 in the non-overlapping manner. To each window 22, the skin color smoothing process calculates an average value of all pixels in the selection window 22, and sets the average value as the processed pixel value of all pixels in the selection window 22. For example for an inputting 3*3 pixel array, the output is also a 3*3 pixel array; and the pixels values of the output 3*3 pixel array are all the same.

The size of the selection window is not limited in the present invention, and may be a 3*3 pixel array or a 5*5 pixel array. The size of the selection window depends on the size of the Img$_{original}$ or the speed of the processing hardware. When the selection window is large, although the processing time may be shortened, the quality in skin color processing of the image is degraded. On the contrary, when the selection window is small, although the quality in skin color processing may be improved, more processing time is taken for moving the selection window.

Figure 5:
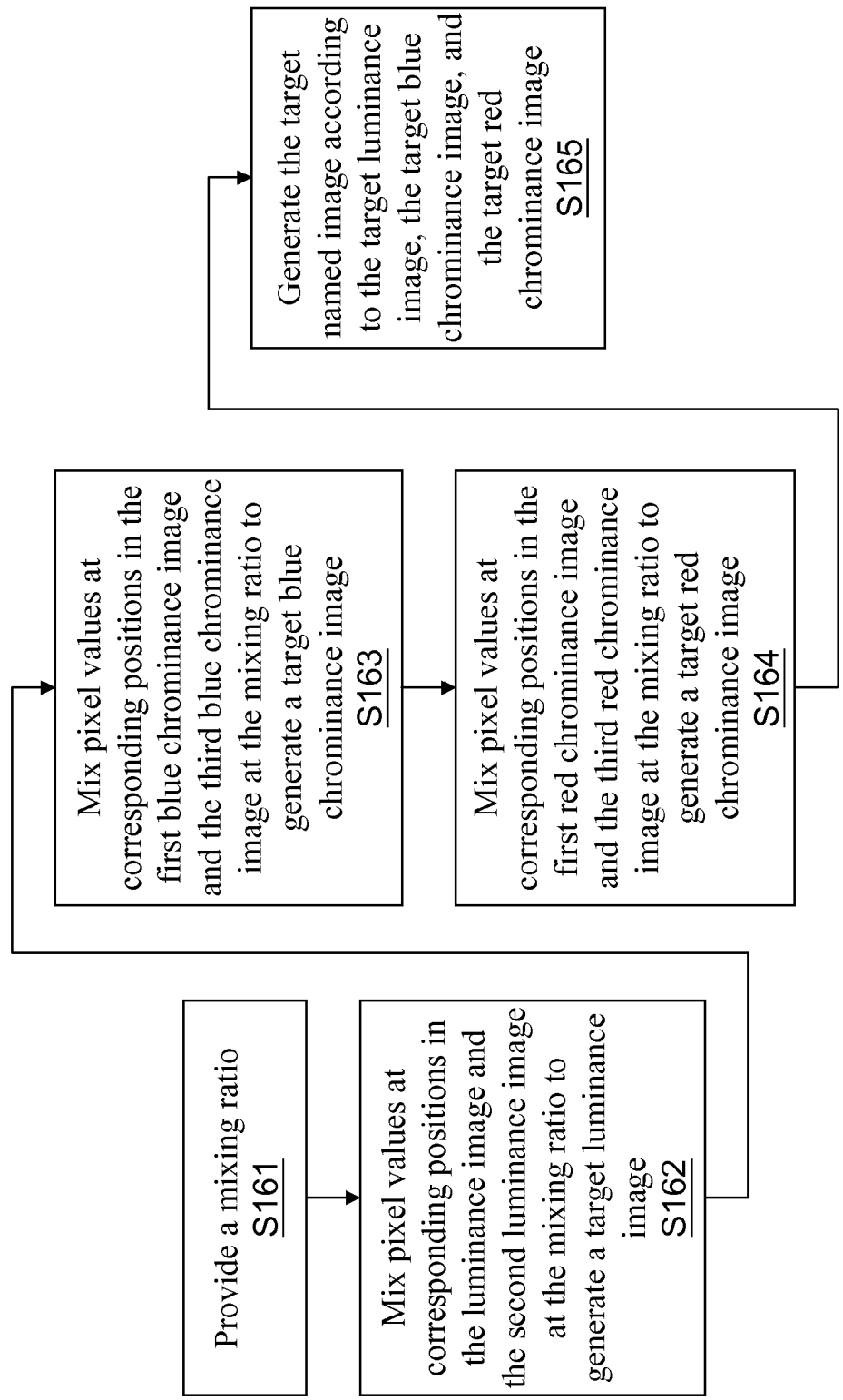
FIG. 5 shows the process for performing the image mixing process in Step S160.

FIG. 5 is a schematic view of the process of performing the image mixing process in Step S160, which further comprises the following steps:

Provide a mixing ratio α (Step S161);

Mix pixel values at corresponding positions in the luminance image Y and the second luminance image Y$_{LP}$ at the mixing ratio α to generate a target luminance image Yo (Step S162), in which $$Y_o(x,y) = \alpha \times Y(x,y) + (1-\alpha) \times Y_{LP}(x,y) \quad \text{(Equation 8);}$$

Mix pixel values at corresponding positions in the first blue chrominance image Cb$_a$ and the third blue chrominance image Cb$_{LP}$ at the mixing ratio α to generate a target blue chrominance image Cb$_o$ (Step S163), in which $$Cb_o(x,y) = \alpha \times Cb_a(x,y) + (1-\alpha) \times Cb_{LP}(x,y) \quad \text{(Equation 9)}$$

Mix pixel values at corresponding positions in the first red chrominance image Cr$_a$ and the third red chrominance image Cr$_{LP}$ at the mixing ratio α to generate a target red chrominance image Cr$_o$ (Step S164), in which $$Cr_o(x,y) = \alpha \times Cr_a(x,y) + (1-\alpha) \times Cr_{LP}(x,y) \quad \text{(Equation 10); and}$$

Generate the target image named Img$_{tar}$ according to the target luminance image Yo, the target blue chrominance image Cb$_o$, and the target red chrominance image Cr$_o$ (Step S165).

In Equations 8, 9, and 10, when the skin color proportion is higher in the Img$_{original}$, the mixing ratio α is lower, such that a large proportion of the skin color in the original image is maintained. On the contrary, after the estimation according to the skin-color probability plot, the skin color may be considered as non-skin-color pixels and thus adjusted. At this time, the proportion of the original image (non-skin-color pixels) is lowered, and the proportion of Y$_{LP}$, Cb$_{LP}$, and Cr$_{LP}$ is increased, so as to adjust the color to be closer to the skin color.

Figure 6:
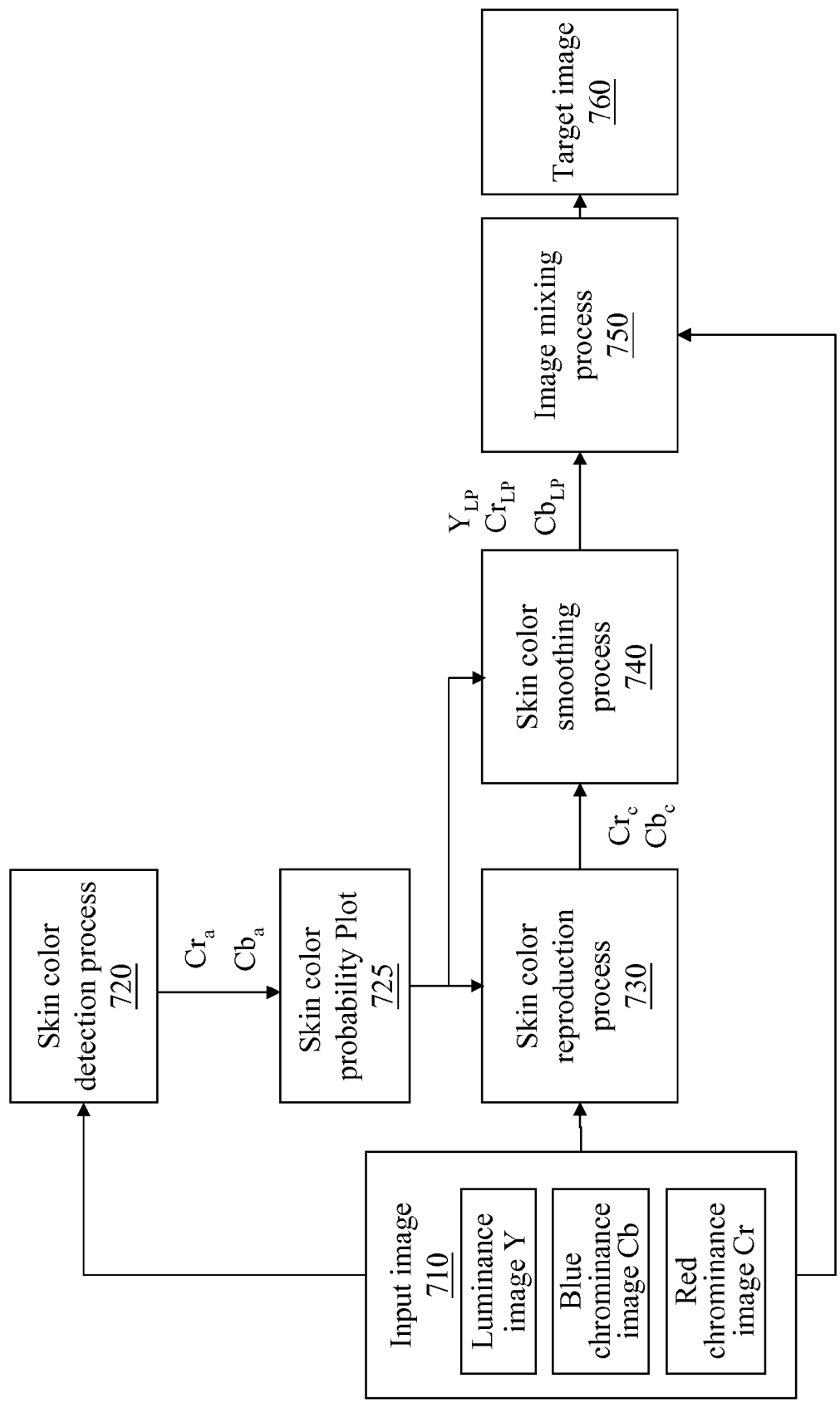
FIG. 6 is a schematic view of the operating architecture of the present invention.

To illustrate the operating architecture of the present invention clearly, FIG. 6 is a schematic view of the operating architecture of the present invention. Referring to FIG. 6, the architecture of the present invention comprises a skin color detection process 720, a skin color reproduction process 730, a skin color smoothing process 740, and an image mixing process 750. Referring to FIGS. 1-5 and FIG. 6 together, firstly, the skin color detection process 720 is performed on an input image named $Img_{original}$ 710 to obtain a first blue chrominance image $Cb_a$ and a first red chrominance image $Cr_a$. Next, the first blue chrominance image $Cb_a$ and the first red chrominance image $Cr_a$ are processed by the skin-color probability plot 725 and the skin color reproduction process 730 to generate a second blue chrominance image $Cb_c$ and a second red chrominance image $Cr_c$ in the second image named $Img_2$. Performing the skin color reproduction process 730 for generating the luminance image Y, the second blue chrominance image $Cb_c$, and the second red chrominance image $Cr_c$. Afterward, image areas are respectively selected from the luminance image Y, the second blue chrominance image $Cb_c$, and the second red chrominance image $Cr_c$ by using a selection window, and then are processed by a filter, to respectively generate a second luminance image $Y_{LP}$, a third blue chrominance image $Cb_{LP}$, and a third red chrominance image $Cr_{LP}$ in the third image named $Img_3$. Then, the second luminance image $Y_{LP}$, the third blue chrominance image $Cb_{LP}$, and the third red chrominance image $Cr_{LP}$ are respectively mixed with the luminance image Y, the first blue chrominance image $Cb_a$, and the first red chrominance image $Cr_a$ at a mixing ratio α by performing the image mixing process 750. Finally, a target image named $Img_{tar}$ 760 is generating by using the generated target luminance image Yo, the target blue chrominance image $Cb_o$, and the target red chrominance image $Cr_o$.

The present invention provides a method for beautifying a skin color in a digital image, especially the facial skin of a person captured in the image. In the present invention, the skin-color probability plot is used to perform a skin color comparison on the input image to remove noises (especially dark spots, dust, or other non-skin-color images) other than the skin color, so as to improve the integrity of the skin of the person captured in the digital image, thus improving the appearance of the person captured in the digital image.

What is claimed is:

1. A method for adjusting a skin color of a digital image, adapted to adjust the skin color of an input image, the method comprising:
   loading the input image;
   performing a skin color detection process on the input image to generate a skin-color probability plot Sp in a size corresponding to the input image;
   providing a hue-saturation lookup table named LUT_Color;
   performing a skin color reproduction process on the input image to look up the LUT_Color for a chrominance pixel value of a corresponding color for each pixel value of the input image to generate a first image;
   adjusting each pixel value of the first image by using the skin-color probability plot Sp to generate a second image, comprising:
      obtaining a first blue chrominance image $Cb_a$ and a first red chrominance image $Cr_a$;
      respectively performing a calculation at a corresponding ratio on each pixel in the first blue chrominance image $Cb_a$ and the blue chrominance image Cb according to the skin-color probability plot Sp, to output a second blue chrominance image $Cb_c$, wherein $Cb_c(x,y)=Sp(x,y) \times Cb_a(x,y)+(255-Sp(x,y) \times Cb(x,y))$, and (x,y) is position coordinates of a pixel;
      respectively performing a calculation at a corresponding ratio on each pixel in the first red chrominance image $Cr_a$ and the red chrominance image Cr according to the skin-color probability plot Sp, to output a second red chrominance image $Cr_c$, wherein $Cr_c(x,y)=Sp(x,y) \times Cr_a(x,y)+(255-Sp(x,y) \times Cr(x,y))$, and (x,y) is position coordinates of a pixel; and
      generating the second image according to the second blue chrominance image $Cb_c$ and the second red chrominance image $Cr_c$;
   performing a skin color smoothing process on the second image to generate a third image; and
   performing an image mixing process to mix pixel values of the input image and the third image at a corresponding mixing ratio to generate a target image.

2. The method for adjusting a skin color of a digital image according to claim 1, wherein the input image at least comprises a luminance image Y, a blue chrominance image Cb, and a red chrominance image Cr.

3. The method for adjusting a skin color of a digital image according to claim 2, wherein the step of looking up the LUT_Color further comprises:
   selecting a pixel from the input image;
   obtaining a blue chrominance pixel value and a red chrominance pixel value from the blue chrominance image Cb and the red chrominance image Cr respectively according to a position of the selected pixel;
   for the blue chrominance image, looking up the LUT_Color according to the blue chrominance pixel value and the red chrominance pixel value to generate a first blue chrominance image $Cb_a$, wherein $Cb_a$=LUT_Color[Cb][Cr];

for the red chrominance image, looking up the LUT_Color according to the blue chrominance pixel value and the red chrominance pixel value to generate a first red chrominance image $Cr_a$, wherein $Cr_a$=LUT_Color[Cr][Cb]; and generating the first image by using the luminance image Y, the first blue chrominance image $Cb_a$ and the first red chrominance image $Cr_a$.

4. The method for adjusting a skin color of a digital image according to claim 1, wherein the step of performing the skin color smoothing process further comprises:
   setting a selection window for selecting areas at a same position and of a same pixel array size in the images; and
   respectively selecting image areas from the luminance image Y, a second blue chrominance image $Cb_c$, and a second red chrominance image $Cr_c$ by using the selection window, and processing the selected image areas by a filter, to respectively generate a second luminance image $Y_{LP}$, a third blue chrominance image $Cb_{LP}$, and a third red chrominance image $Cr_{LP}$ in the third image, wherein $$Y_{LP}(x, y) = \frac{\sum Y(i,j)}{N},$$

$$Cb_{LP}(x, y) = \frac{\sum Cb_c(i,j)}{N},$$

-continued $$Cr_{LP}(x, y) = \frac{\sum Cr_c(i,j)}{N},$$

and (x,y) is a position coordinates of a pixel, and N is a number of pixels in the selection window.

5. The method for adjusting a skin color of a digital image according to claim 4, wherein the filter is a low-pass filter or a nonlinear filter.

6. The method for adjusting a skin color of a digital image according to claim 4, wherein the step of performing the image mixing process further comprises:
    providing a mixing ratio α;
    mixing pixel values at corresponding positions in the luminance image Y and the second luminance image $Y_{LP}$ at the mixing ratio α to generate a target luminance image Yo, wherein $Y_o(x,y)=\alpha\times Y(x,y)+(1-\alpha)\times Y_{LP}(x,y)$;
    mixing pixel values at corresponding positions in the first blue chrominance image $Cb_a$ and the third blue chrominance image $Cb_{LP}$ at the mixing ratio α to generate a target blue chrominance image $Cb_o$, wherein $Cb_o(x,y)=\alpha\times Cb_a(x,y)+(1-\alpha)\times Cb_{LP}(x,y);$ mixing pixel values at corresponding positions in the first red chrominance image $Cr_a$ and the third red chrominance image $Cr_{LP}$ at the mixing ratio α to generate a target red chrominance image $Cr_o$, wherein $Cr_o(x,y)=\alpha\times Cr_a(x,y)+(1-\alpha)\times Cr_{LP}(x,y)$ ; and
    generating the target image according to the target luminance image Yo, the target blue chrominance image $Cb_o$, and the target red chrominance image $Cr_o$.

7. A method for adjusting a skin color of a digital image, adapted to adjust the skin color of an input image, the method comprising:
    loading the input image, wherein the input image at least comprises a luminance image Y, a blue chrominance image Cb, and a red chrominance image Cr;
    performing a skin color detection process on the input image to generate a skin-color probability plot Sp in a size corresponding to the input image;
    providing a hue-saturation lookup table named LUT_Color;
    performing a skin color reproduction process on the input image, wherein the skin color reproduction process comprises:
        selecting a pixel from the input image;
        obtaining a blue chrominance pixel value and a red chrominance pixel value from the blue chrominance image Cb and the red chrominance image Cr respectively according to a position of the selected pixel;
        for the blue chrominance image, looking up the LUT_Color according to the blue chrominance pixel value and the red chrominance pixel value to generate a first blue chrominance image $Cb_a$, wherein $Cb_a$=LUT_Color[Cb][Cr];
        for the red chrominance image, looking up the LUT_Color according to the blue chrominance pixel value and the red chrominance pixel value to generate a first red chrominance image $Cr_a$, wherein $Cr_a$=LUT_Color[Cr][Cb];
        generating the first image by using the luminance image Y, the first blue chrominance image $Cb_a$ and the first red chrominance image $Cr_a$; and
    adjusting each pixel value of the first image by using the skin-color probability plot Sp to generate a second image;
    performing a skin color smoothing process on the second image to generate a third image; and
    performing an image mixing process to mix pixel values of the input image and the third image at a corresponding mixing ratio to generate a target image.

8. The method for adjusting a skin color of a digital image according to claim 7, wherein the step of performing the skin color smoothing process further comprises:
    setting a selection window for selecting areas at a same position and of a same pixel array size in the images; and
    respectively selecting image areas from the luminance image Y, a second blue chrominance image $Cb_c$, and a second red chrominance image $Cr_c$ by using the selection window, and processing the selected image areas by a filter, to respectively generate a second luminance image $Y_{LP}$, a third blue chrominance image $Cb_{LP}$, and a third red chrominance image $Cr_{LP}$ in the third image, wherein $$Y_{LP}(x, y) = \frac{\sum Y(i \cdot j)}{N},$$

$$Cb_{LP}(x, y) = \frac{\sum Cb_c(i \cdot j)}{N},$$

$$Cr_{LP}(x, y) = \frac{\sum Cr_c(i \cdot j)}{N},$$

and (x,y) is position coordinates of a pixel, and N is a number of pixels in the selection window.

9. The method for adjusting a skin color of a digital image according to claim 8, wherein the filter is a low-pass filter or a nonlinear filter.

10. The method for adjusting a skin color of a digital image according to claim 8, wherein the step of performing the image mixing process further comprises:
    providing a mixing ratio α;
    mixing pixel values at corresponding positions in the luminance image Y and the second luminance image YLP at the mixing ratio α to generate a target luminance image $Y_o$, wherein $Y_o(x,y)=\alpha\times Y(x,y)+(1-\alpha)\times Y_{LP}(x,y);$ mixing pixel values at corresponding positions in the first blue chrominance image $Cb_a$ and the third blue chrominance image $Cb_{LP}$ at the mixing ratio α to generate a target blue chrominance image $Cb_o$, wherein $Cb_o(x,y)=\alpha\times Cb_a(x,y)+(1-\alpha)\times Cb_{LP}(x,y);$ mixing pixel values at corresponding positions in the first red chrominance image $Cr_a$ and the third red chrominance image $Cr_{LP}$ at the mixing ratio α to generate a target red chrominance image $Cr_o$, wherein $Cr_o(x,y)=\alpha\times Cr_a(x,y)+(1-\alpha)\times Cr_{LP}(x,y);$ and generating the target image according to the target luminance image $Y_o$, the target blue chrominance image $Cb_o$, and the target red chrominance image $Cr_o$.

* * * * *